United States Patent [19]

Langlais et al.

[11] Patent Number: 4,531,600
[45] Date of Patent: Jul. 30, 1985

[54] ELECTRICAL MEASUREMENT CIRCUIT INCLUDING A LOW-PASS FILTER, IN PARTICULAR FOR WEIGHING

[75] Inventors: Jacques F. Langlais, Coudray-Montceaux; Gilbert C. Brisset, Paris, both of France

[73] Assignee: Testut-Aequitas, Paris, France

[21] Appl. No.: 556,316

[22] Filed: Nov. 30, 1983

[30] Foreign Application Priority Data

Dec. 2, 1982 [FR] France ................. 82 20201

[51] Int. Cl.³ .................. G01G 23/10; G01G 3/14
[52] U.S. Cl. ..................... 177/185; 177/211; 73/862.67
[58] Field of Search .............. 177/185, 211; 73/862.67; 324/78 E, 78 F; 333/172, 174; 364/724

[56] References Cited

U.S. PATENT DOCUMENTS

| | | | |
|---|---|---|---|
| 3,434,343 | 3/1969 | Senour | 177/211 X |
| 3,525,991 | 8/1970 | Kohler | 177/211 X |
| 4,045,731 | 8/1977 | Tokunou et al. | 324/77 E X |
| 4,120,370 | 10/1978 | Bosson et al. | 177/185 |

FOREIGN PATENT DOCUMENTS 2323131 1/1977 France .
2321698 3/1977 France .
1407195 9/1975 United Kingdom .

Primary Examiner—E. A. Goldberg
Assistant Examiner—Patrick W. Foster
Attorney, Agent, or Firm—Blakely, Sokoloff, Taylor & Zafman

[57] ABSTRACT

A link of controllable resistance comprising an FET (Q16) connected in series with a low-value resistor (R15) is connected in parallel with a time constant determining resistance (R11) in an RC type low-pass filter. A discriminator circuit (40, 50, 60) provides an on/off type signal following variations in the DC component of an input signal present on a terminal (A). A retriggerable monostable (80) defines a "neutral" time interval of predetermined duration running from the beginning of said on/off signal. At the end of said neutral period, a circuit (20) switches the FET on, thereby reducing the time constant of the RC network in the RC low-pass filter. This time constant is subsequently progressively rasied to a high value by progressively switching the FET off. The filter is specially applicable to weighing a body that is subjected to movement or to oscillation, or to performing weighing measurements in a vibrating environment.

10 Claims, 15 Drawing Figures

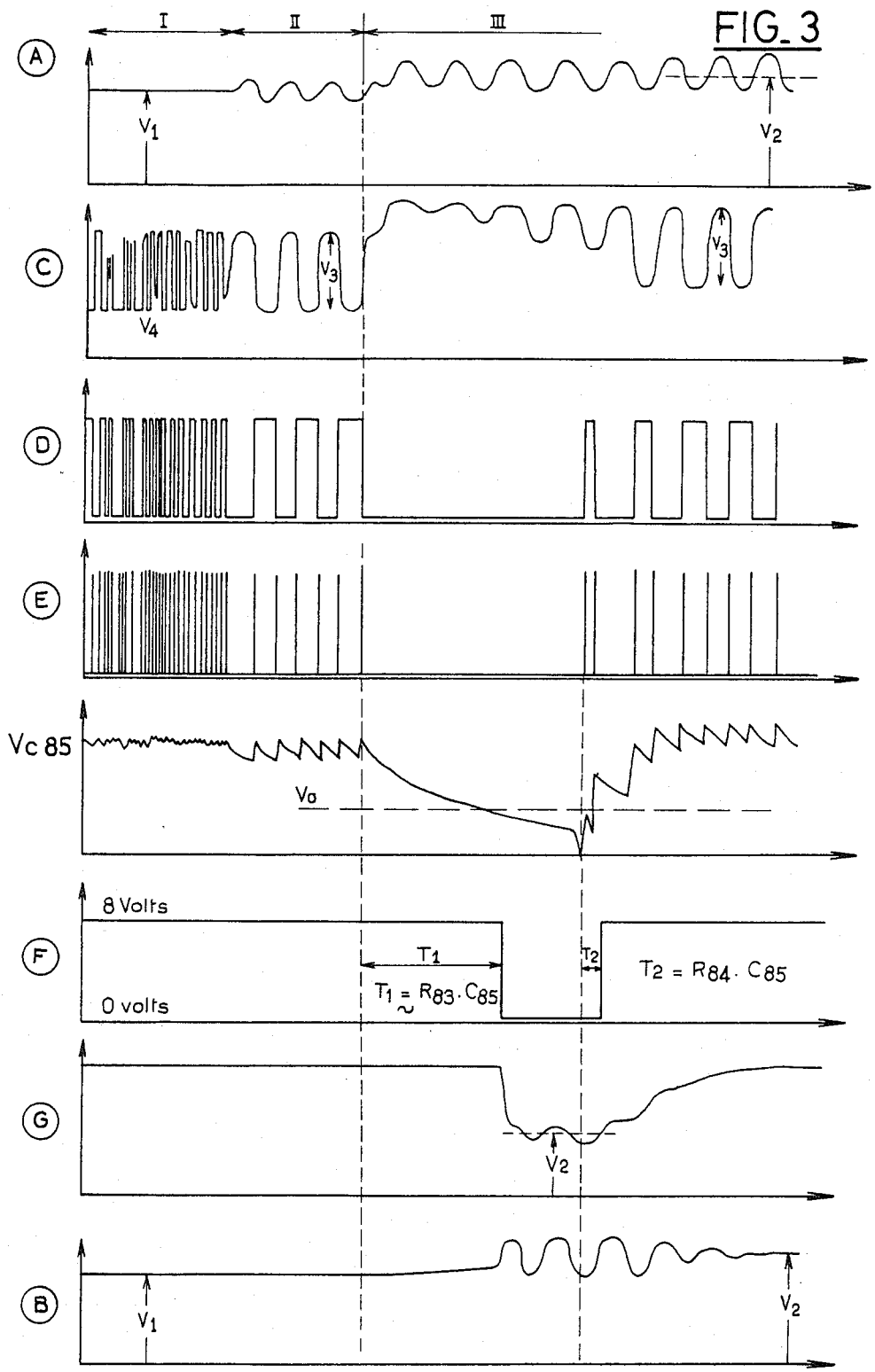
FIG_3

ELECTRICAL MEASUREMENT CIRCUIT INCLUDING A LOW-PASS FILTER, IN PARTICULAR FOR WEIGHING

The present invention relates to low-pass filtering of analog signals and is specially applicable to weighing scales having digital readout.

BACKGROUND OF THE INVENTION

Conventional low-pass filters are suitable for following variations in the DC component of a signal which includes parasitic oscillations. However, to do this they require time. In applications such as weighing, the DC component tends to vary rather abruptly (i.e. when a body is placed on the scale pan). It may also happen that oscillations are superposed on the DC component, either from the body being weighed (e.g. weighing babies or animals) or from the support on which the scales are mounted (e.g. scales on a delivery truck or other vehicle).

Such oscillations or vibrations may be at very low frequencies, e.g. as low as 1 Hz. If a conventional low-pass filter is used to eliminate oscillations at such frequencies, the time required for the output signal from the filter to settle down with sufficient accuracy to the DC component of the input signal applied thereto, i.e. to a value representative of the weight being weighed, becomes prohibitive.

Preferred embodiments of the present invention enable this problem to be solved by providing a new electronic measurement circuit including a low-pass filter which is particularly, but not exclusively, intended for weighing applications.

SUMMARY OF THE INVENTION

An electronic measurement circuit including a low-pass filter, in particular for weighing, said circuit comprising an active input terminal, an active output terminal, a common terminal, and a two-port low-pass filter network connected between said terminals and including resistive components and reactive components, the improvement wherein the circuit comprises:

a link of controllable resistance connected in parallel with at least one of said resistive components;

discriminator means responsive to an input signal on said active input terminal to provide an on/off type signal following variations in the DC component of said signal present at said active input terminal, the pulse width of said on/off signal increasing with increasing amplitude in the variation of said DC component;

delay means for defining a "neutral" time interval of predetermined duration following the beginning of a pulse in said on/off signal; and control means for controlling said link of controllable resistance in such a manner as to switch in a low value of resistance at the end of said neutral time interval and to progressively increase said controllable value of resistance to a high value following the end of a pulse in said on/off signal.

In a preferred embodiment, the link of controlled resistance includes a field effect transistor (FET), and wherein said control means includes a circuit having first and second time constants, said first time constant being suitable for causing said transistor to conduct rapidly after the end of said neutral time interval, and said second time constant being suitable for bringing said transistor to the off state in a progressive manner.

More particularly, the control means may include a circuit connected to said active input terminal for the purpose of applying to the gate electrode of the FET a conduction control voltage which is close to the voltage applied to the input terminal.

In prinicple, the link of controlled resistance and the circuit having first and second time constants are connected in such a manner that the time constant of the two-port low-pass filter network varies at a slower rate than the lowest frequency to be filtered.

In most applications, the minimum frequency to be filtered is about 1 Hertz. In the particularly difficult case of scales for weighing a baby, it is desirable that vibrations at 'Hz be eliminated, which supposes that the minimum or cut-off frequency is lower still.

In a particular embodiment, the discriminator means include an oscillation amplifier stage having high gain, at least at low signal levels, and connected to said input terminal, a comparator stage having a first input connected to said input terminal and having a second input connected to the second output from said oscillation amplifier, and a differentiator stage connected to the output from the comparator stage, said on/off signal being defined on the basis of a lasting absence of pulses at the output from the differentiator stage.

Said delay means preferably comprise a retriggerable monostable circuit which is connected to the output from the differentiator stage and which provides said on/off signal at its output minus a period of predetermined duration at the beginning of each pulse therein, i.e. minus said "neutral" time interval.

In weighing applications, the circuit is connected between a weight sensor circuit and an analog to digital converter for providing a digital indication of a weight.

A low-pass filter circuit in accordance with the invention improves the ease with which weight measurements can be made. This is well illustrated in the case of scales intended for weighing babies.

For this application, the analog to digital converter is followed by a control logic circuit which is associated with a memory, a keyboard and a digital readout. The control logic circuit is responsive to a specific command from the keyboard in such a manner that, on receiving information representative of a specific memory address, it stores the newly-measured weight at said address and displays the difference between said newly-measured weight and the previous weight stored at said address.

Babies may thus be weighed before and after a feed, and the difference measurement obtained is accurately representative of the quantity of food taken.

BRIEF DESCRIPTION OF THE DRAWINGS

An embodiment of the invention is described by way of example with reference to the accompanying drawings in which:

FIGS. 3A, 3B, 3C, 3D, 3E, 3F, 3G and 3Vc85 are waveform diagrams showing the signals available at various points in the circuit shown in FIG. 2;

MORE DETAILED DESCRIPTION

Figure 1:
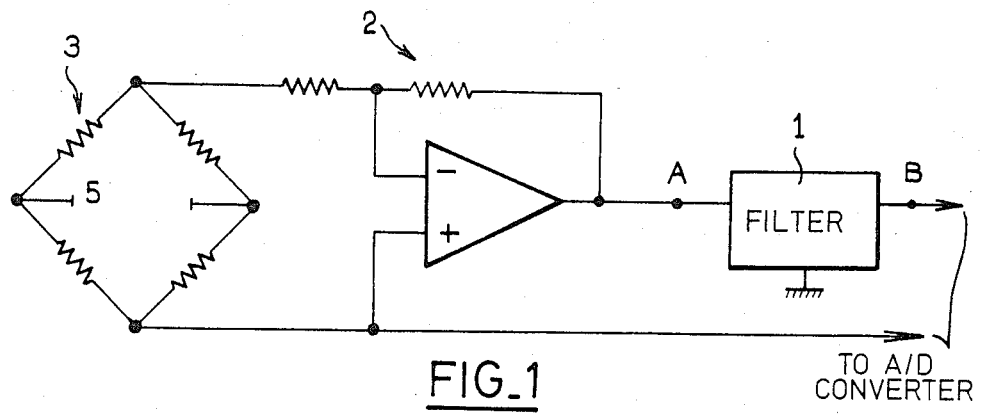
FIG. 1 is an electrical circuit diagram of a conventional circuit including a weight sensor and a filter.
Figure 4:
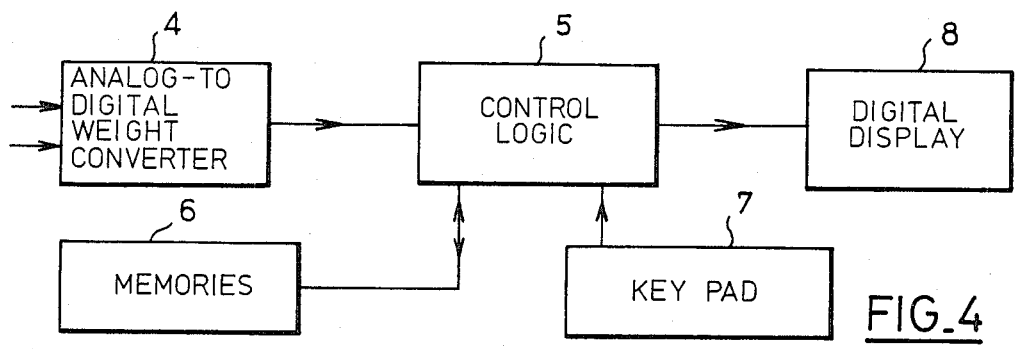
FIG. 4 is a block diagram of an improved analog to digital converter and display system in accordance with the present invention.

FIG. 1 shows a conventional weighing circuit for use with a digital readout. The weight is received on scales (not shown) which may be of the ring structure described in published French patent application No. 2 469 701 and provided with strain gauges as sensors. The strain gauges are connected in a bridge 3 which is followed by an amplifier state 2 and then by a low-pass filter 1 whose output is applied to the input of an analog to digital converter 4 (FIG. 4). The analog-to-digital converter is referred hereinafter as a weight converter since it is arranged to have a digital output which is significant in units of weight. The filter 1 as conventionally comprised has two RC low-pass cells connected in series, for example.

Difficulties have been encountered when the scales or the body being weighed are subjected to oscillations or vibrations. Scales for weighing babies are a typical case: a newborn baby moves a great deal, and necessarily at low frequencies. A conventional filter capable of adequately filtering such low frequencies in a weighing signal takes a prohibitively long time to settle down.

To avoid causing the user an excessive waiting time, one known proposal is to provide a pushbutton for determining the instant at which the measurement is taken. This generally means that the measurement is made prematurely, and is thus spoilt by error. Finally, the error is not negligible in that the values taken are often made for the purpose of obtaining a difference value, e.g. before and after a feed.

The present invention provides an improved electronic filter which generally enables an oscillation-free signal to be obtained in reduced time. When applied to weighing, this filter solves the specific problem connected with the presence of unwanted and unavoidable oscillations, regardless of whether these oscillations effect the support for the weighing instrument or the body to be weighed or both.

Figure 2:
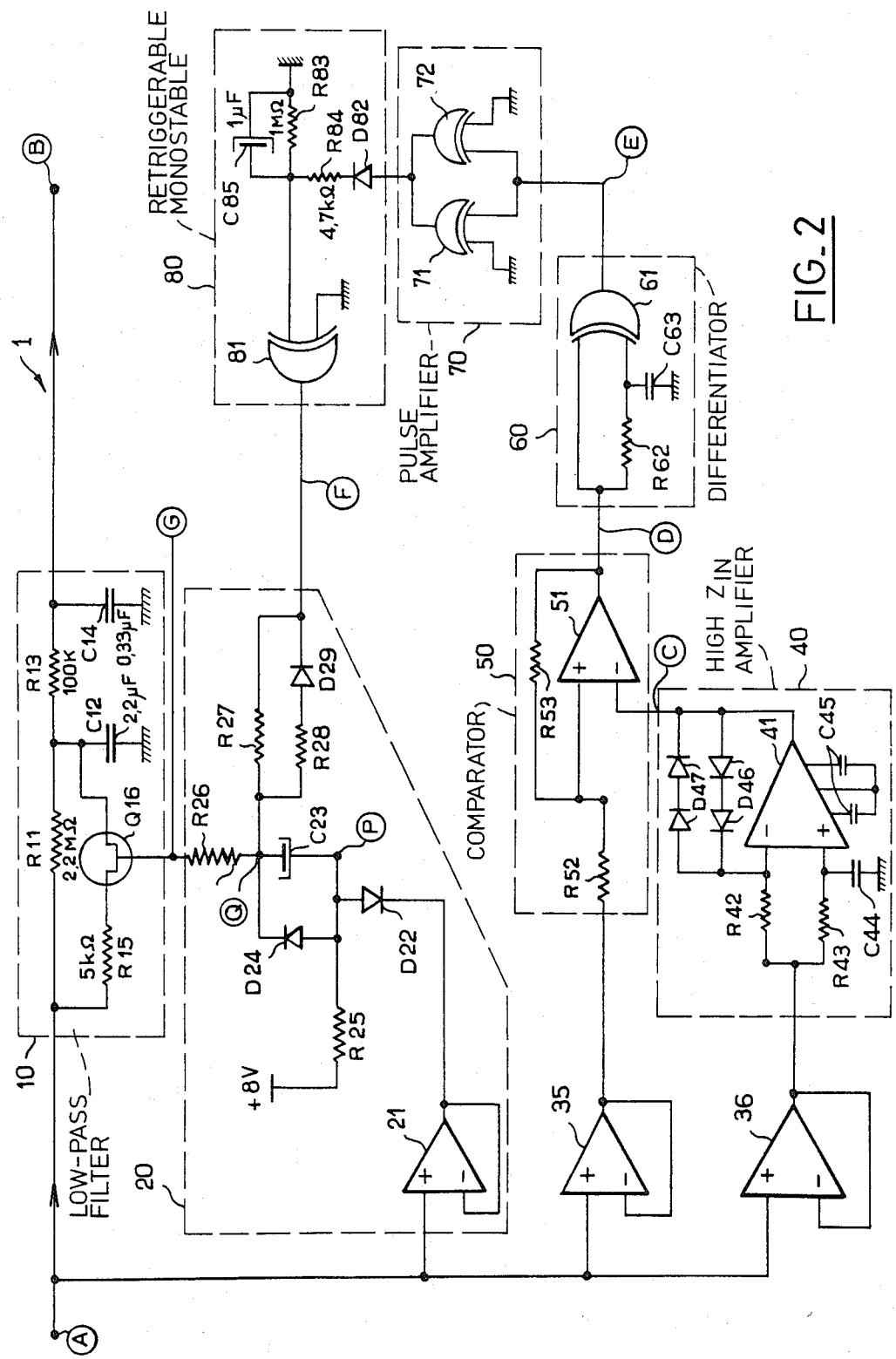
FIG. 2 is a detailed electrical circuit diagram of one embodiment of an improved low-pass filter in accordance with the present invention.

FIG. 2 is an detailed circuit diagram of the filter which is inserted in place of the block 1 of FIG. 1. In FIG. 2, the filter comprises an active input terminal A, an active output terminal B and a common or ground terminal, all three of which are also visible in FIG. 1. A two-port network generally designated by the reference 10 is connected between the active terminals A and B and ground. The network 10 is constituted by two RC cells connected in series, the first cell comprises a series resistance R11 followed by a parallel capacitance C12 and the second cell comprises a series resistance R13 followed by a parallel capacitance C14. Each of the capacitances thus has one terminal connected to ground.

In accordance with the present invention, a link of controllable resistance is connected in parallel on the first series resistance R11. The link of controllable resistance is constituted, in the embodiment shown, by a resistance R15 connected in series with the source-drain path through a field effect transistor (FET) Q16. The FET Q16 is a P channel insulated gate metal oxide semiconductor type transistor (P channel IGMOS).

By way of specific example, for weighing babies, the resistance R11 should be 2.2 megohms, the resistance R13 100 kilohms, the resistance R15 5 kilohms, the capacitance C12 2.2 microfarads and the capacitance C14 0.33 microfarads. Finally, the FET may be a J271 type transistor manufactured by SILICONIX or NATIONAL SEMI-CONDUCTOR.

It can immediately be seen that when the FET Q16 is off, the RC circuit R11, C12 has a time constant of 4.84 s. The following RC circuit (R13 and C14) has a time constant of 33 ms, thus providing additional filtering particularly in view of the switching applied to the first filter cell.

When the FET Q16 is conductive, the resistance R15 rapidly predominates and the final time constant of the first cell becomes that defined by R15 and C12, namely 11 ms.

The present invention also provides for a particular form of control of the way in which the time constant of the first cell is varied by means of the link R15 Q16.

The signal present on the active input terminal A is applied to three amplifier-buffer stages respectively referenced 21, 35 and 36. The stages 35 and 36 constitute a part of discriminator means which also include the blocks 40, 50 and 60 shown in FIG. 2. These discriminator means are sensitive to the signal present at the input terminal A to provide an on/off type signal following a variation in the DC component of the signal present on said active input terminal A. According to an important feature of the present invention, the pulse width of this on/off signal increases with variations of increasing amplitude in the DC component.

More precisely, the discriminator means comprise an oscillator amplifier stage having high gain, at least for low-level signals, and referenced 40. The stage 40 is connected to the input terminal A via the buffer stage 36. It is followed by a comparator 50 whose other input is connected to the input A via the other buffer stage 35. Finally, a differentiator stage 60 is connected to the output of the comparator stage 50. The above-mentioned on/off signal is defined at the output of the differentiator 60 on the basis of a lasting absence of pulses.

The components in the blocks 40, 50 and 60 are now described in greater detail with reference to FIG. 2 and with reference to the waveform diagrams of FIG. 3.

Line A in FIG. 3 shows an input signal as applied to the terminal A. In order to show up the performance of a filter in accordance with the present invention, this input signal comprises a first portion I constituted by a stable voltage at a constant value $V_1$ and completely free from oscillations. Then in a second portion II, low-frequency oscillations are superposed on the DC signal $V_1$. Finally, in a third portion III, the average value of the DC signal increases to reach a level $V_2$, while the superposed oscillations continue.

In FIG. 2, the block 40 is constituted by a very high input impedance differential chopper amplifier referenced 41. This amplifier may, for example, be a type ICL 7650CPD amplifier sold by the INTERSIL company. This amplifier normally has an open loop gain of about $10^6$, and an input impedance of about $10^{10}$ ohms. In known manner, it is provided with two auxiliary capacitances referenced C45 on FIG. 2.

The non-inverting input of the amplifier 41 is connected to the terminal A via the buffer stage 36 and via a series resistor R43 which may have a resistance of 2.2 megohms for example, the non-inverting input is also connected to ground via a capacitor C44 which may have a capacitance of 330 nanofarads for example. This will give a corresponding time constant of about 0.73 s.

The inverting input of the amplifier 41 is connected to the output of the buffer stage 36 via a series resistor R42 having a resistance of 4.7 kilohms, for example. The inverting input is also connected to the output from the amplifier 41 via non-linear diode feedback loop, comprising two diodes D46 connected in series in one direction and in parallel with a second series connection of two diodes D47 which are connected in the opposite direction. The diodes are preferably silicon diodes such as type 1N4148.

The stage 40 connected in this manner has the property of having substantially unity gain for DC input signals. In particular, the input impedance via both the non inverting and the inverting inputs is very high, even in comparison with the internal resistance of the diodes D46 and D47. Further, the current flowing the resistors R42 and R43 as well as through the diodes D46 and D47 is extremely low because of the high input impedance of the amplifier 41. Under DC conditions, the two inputs to the amplifier are at the same potential and the output potential follows the input potential. Once the input signal includes frequencies which exceed a threshold set by the time constant of 0.73 seconds associated with the RC combination R43, C44, things take place differently. The threshold frequency is about 0.3 Hz, given the high gain of the amplifier, its non-linear feedback and the other resistors involved.

As the threshold frequency is approached, the signal applied to the non-inverting input is both phase shifted and attenuated relative to the signal applied to the inverting input of the amplifier 41. The gain of the amplifier then acts very rapidly to change the state of its output. The diodes D46 and D47 prevent said output from saturating and limit the voltage difference between the output and the inverting input to ± 1.2 V. Given that the open loop gain of the amplifier 41 is $10^6$, this corresponds to the voltage difference of 1.2 $\mu$V between the two inputs to the amplifier. The above description applies for signals of small amplitude at greater than the cutoff frequency. When the signal amplitude increases, the feedback produced by the diodes D46 and D47 increases which results in a rapid reduction in the gain of the amplifier stage.

Waveform C in FIG. 3 represents the output signal from the amplifier 41. While the input signal A is in its first portion I, the input to the amplifier 41 only sees high frequency noise signals (not shown on waveform A). Since the noise is of fairly high frequency, it is highly amplified and gives an output signal with a peak-to-peak amplitude of 2.4 V above a minimum voltage threshold equal to $V_4$. During the second portion II of the signal A, the output from the amplifier 41 is a signal having the same frequency as the oscillation applied to the input, but greatly amplified, i.e. the rising and falling edges in the amplified signal are clearly marked and followed by rounded substantially flat portions which mirror the drop in gain of the amplifier 41 once its output voltage exceeds the thresholds defined by the diodes D46 and D47. The peak-to-peak amplitude marked $V_3$ is again equal to about 2.4 V. The average value of this signal is the same as it was during the first phase I.

At the beginning of the third phase III in the signal A, the value of the DC component in the signal increases, arriving from $V_1$ to $V_2$. It has already been specified that the amplifier stage 40 has unity gain for DC levels. Consequently, the voltage value in waveform C rises and then once more takes up the oscillations with increasing amplitude so that they end up oscillating with the same peak-to-peak amplitude $V_3$ as before but with a DC offset relative to the second portion. The oscillations reappear progressively because of the combined effect of the non-linear threshold feedback through the diodes D46 and D47 on the amplifier and on the RC network connected to its non-inverting input. It should be observed that, the greater the step in the DC component of the signal present at the input A, the greater the time it takes for the oscillations to build back up to their previous peak-to-peak amplitude of $V_3$.

The high gain oscillation amplifier stage 40 is followed by a comparator stage 50 with the output from the amplifier 41 being connected to the inverting input of the comparator 51. The non-inverting input of the comparator 51 is connected firstly to the output from the buffer stage 35 via a resistor R52, and secondly to the output from the comparator 51 via a resistor R53. The resistance of the resistor R53 is much greater than the resistance of the resistor R52, typically it is 500 times as large, thereby giving the comparator 51 low hysteresis performance.

The comparator stage 50 thus compares the input signal A with the signal present at point C as shown by the first two waveform diagrams in FIG. 3. During the first phase I, the peak-to-peak amplitude at the output from point C is large, which causes rapid altenations in the output from the comparator stage 50 between two extreme voltages. This happens at noise frequency, i.e. at a very high frequency. Subsequently, during the second phase II things take place as before but at the frequency of the oscillations which are superimposed on the DC component on the signal A. A rectangular waveform is thus obtained. At the beginning of the third phase III, the signal at point C stays permanently higher than the input signal A. Since the signal at the point C is applied to the inverting input of the comparator 51, the output from the comparator stays permanently low. After a certain time lapse, of duration related to the rate at which oscillations reappear at point C, the signal at the point A again exceeds the signal at the point C from time to time. In the example shown where the DC component has increased, this effect begins by the negative half-cycles of the signal A being exceeded. Thus, the output signal from the comparator at point D and as shown by the third waveform diagram in FIG. 3 has pulses which appear during each negative half cycle of signal A and whose duration increases progressively until they last throughout each negative half cycle. The resulting steady state conditions at point D are then the same as they were at point D during the second phase II.

The signal D is then applied to a differentiator stage 60 which is connected to the output from the comparator stage 50.

In the embodiment shown, the differentiator stage 60 is constituted by an exclusive OR gate 61 having one input which is directly connected to the output from stage 50 and having its other input connected to the same output via an RC network constituted by a series resistor R62 and a parallel capacitor C63 connected to ground. The RC network causes a phase shift between the two inputs to the gate 61. Consequently, each rapid transition which appears in the signal D will give rise to the appearance of a pulse in the signal E available at the output from the gate 61. This signal E is shown in waveform E of FIG. 3. It includes multiple closely adjacent pulses during the first portion I of the input signal A.

During the second portion II, the waveform E includes pulses which occur at substantially the same instance as the zero passes of the input signal A. At the beginning of the third portion III, there are no pulses in the waveform E. Pulses reappear when the signal V reappears. To begin with, these pulses comprise pairs of pulses which are close together and separated by relatively wide time intervals from the adjacent pairs of pulses. As the system returns to its prior steady state conditions, with the oscillations in the signal C returning to a peak-to-peak amplitude $V_3$, the pulses in the signal E become progressively more regularly spaced in time.

The previously-mentioned on/off signal is defined by a lasting absence of pulses in the signal E, i.e. in the output from the differentiator stage. It was mentioned above that the greater the step or variation in the DC component of the signal A, the longer it takes the signal C to return to its normal peak-to-peak amplitude $V_3$. Thus, the greater the step in the DC component in the input signal A, the longer the on portion of the on/off signal deduced from the signal E.

The signal E is applied to an intermediate amplifier stage 70 comprising two exclusive OR gates 71 and 72 connected in parallel. One of the inputs of each of these gates receives the signal E, while the other input of each of the gates is connected to ground. The person skilled in the art will understand that the output from the stage 70 reproduces the waveform of the signal E but at greater energy.

After this intermediate amplifier stage 70, the signal E is applied to a retriggerable monostable circuit 80. In the embodiment shown, the retriggerable monostable circuit is based on a capacitor C85 which is connected in parallel with a resistor R83, with one of their combined terminals being connected to ground. The other terminal of said assembly is connected via a resistor R84 to the cathode of a diode D82 whose anode is connected to the output from the intermediate amplifier stage 70. Finally, the "live" point which is common to the capacitor C85 and to the resistors R83 and R84 is also connected to one input of an exclusive OR gate 81 whose other input is connected to ground. The capacitor C85 has a capacitance of 1 microfarad for example while the resistors R83 and R84 are of very different resistances, the resistor R84 being 4.7 kilohms for example while the resistor 83 is 1 megohm. As a result, the output from the intermediate amplifier stage 70 charges the capacitor C85 with a very rapid time constant that depends essentially on the value of the resistor R84, while the same capacitor discharges with a very slow time constant which depends essentially on the value of the resistor R83.

The frequent pulses present during phases I and II of the signal A thus give rise to repeated charging of the capacitor C85 causing it to operate as a retriggerable monostable circuit. However, when the pulses disappear at the beginning of the third phase III, the capacitor C85 discharges slowly as shown by waveform $V_{C85}$ in FIG. 3. Once the voltage across the capacitor drops to the switchover voltage $V_1$ of the gate 81, the signal F available at the output from said gate changes state and switches from a high level to a low level.

This takes place after a time interval $T_1$ which is essentially determined by the time constant $R83 \times C85$. It can thus be seen that the retriggerable monostable circuit 80 defines a neutral time interval of predetermined duration $T_1$ immediately following the beginning of the on/off signal.

At the end of the on/off signal, or shortly thereafter, the signal at the point F returns to its maximum value. What happens is that the first pulse which appears in the signal E is generally insufficient to recharge the capacitor C85 enough to exceed the voltage $V_0$ in a detectable manner thereby causing the gate 81 to change state. However, the changeover does in fact take place when the second pulse arrives, or possibly on the arrival of a subsequent pulse. Waveform F in FIG. 3 shows the changeover taking place on arrival of the second pulse, i.e. with a delay $T_2$ relative to the first pulse and to the end of the on/off signal. This delay is principally related to the value of the time constant defined by the product $R84 \times C85$.

In accordance with a particular aspect of the present invention, the duration of the neutral time interval is chosen to be at least equal to half of the period of the lowest frequency to be filtered. For example, if the limit frequency is to be 1 Hz, then the duration of the neutral time interval is at least equal to 0.5 s.

The time interval $T_2$ is not critical, but advantageously it should be as short as possible. One way of achieving this would be to use an integrated circuit retriggerable monostable rather than the detailed circuit shown in stage 80 of FIG. 2.

During a neutral time interval of duration $T_1$, the variation or step in the DC component taking place in the signal A at the beginning of phase III is given time to settle down completely. The DC component will thus remain substantially stationary thereafter.

It will be observed that the signal F is taken from the output of a logic gate of a type which varies between an upper value of about 8 V and a lower value close to 0 V.

The signal F available at the output from the monostable stage 80 is applied firstly to a cathode of a diode D29 whose anode is connected via a resistor R28 to a point Q. The point F is also connected directly to the point Q via a resistor R27 of considerably higher resistance than the resistor R28. For example, the resistor R29 may be 270 kilohms while the resistor R28 may be 12 kilohms. The point Q is connected via a resistor R26, e.g. of 47 kilohms, to the gate electrode of the FET Q16. The point Q is further connected to the positive terminal of an electrolytic capacitor C23 whose negative terminal is connected via a resistor R25 to a power supply voltage of +8 V. The point Q is further connected to the cathode of a diode D24 whose anode is connected to the common point between the negative terminal of the capacitor C23 and the resistor R25. This point is referenced P. Finally, the point P is connected to the anode of a diode D22 whose cathode is connected to the output from the buffer amplifier stage 21 which is connected as a unity gain amplifier having its non-inverting input connected to the point A in the same manner as for the other buffer amplifier.

During phases I and II of the signal at point A, the signal F remains stationary at a value of +8 V. This voltage is applied to the point Q via the resistor R27. It thus appears on the positive terminal of the capacitor C23. The point P, i.e. the negative terminal of the capacitor C23, follows the voltage present at the input A, plus an offset voltage equal to the threshold voltage of the diode D22. If the diode is a silicon diode, this offset value is about 0.6 V. The capacitor C23 is thus charged substantially to the difference between the voltage present at the point F and the voltage present at the point A (apart from the 0.6 V due to the diode D22 and apart from the fact that the signal at the point F is slightly less than 8 V). The voltage at the point Q is thus applied to the insulated gate electrode of the FET Q16, which is turned off thereby, and which thus presents a very high impedance between the resistor R15 and the common point between the resistor R11 and the capacitor C12.

The filter properties of the two-port network 10 are thus defined in its first cell by the resistor R11 and the capacitor C12 on their own, and in its second cell by the resistor R13 and the capacitor C14. Given the numerical values mentioned above, the RC network R11 C12 predominates, and defines a time constant of about 5 s (the product is more exactly 4.84 s). Waveform G in FIG. 3 shows that the FET Q16 remains in the off condition for a time interval $T_1$ at the beginning of phase III during which the signal F remains at about +8 V. Under these conditions, the signal B which is representative of the output signal from the two-port filter network, increases very slightly as it begins to follow the variation of the DC component in the signal A, but with a high degree of "inertia".

When the time interval $T_1$ is over, the signal F changes state switching abruptly to a value close to zero. The capacitor C23 in the stage 20 then discharges rapidly through the resistor R28 and the diode D29. Very quickly, the FET Q16 becomes conductive (i.e. it is switched on) and this causes the resistor R15 to define, in conjunction with the capacitor C12, a new time constant for the first cell of the two-port filter network 10. As mentioned above, this new time constant is 11 ms. Oscillations immediately appear in the output signal B. These oscillations rapidly build up in amplitude to an average value similar to the oscillations present in the signal A. This state of affairs remains until the signal F returns to +8 V.

It may be observed, that while the signal F is at its low level, the DC component of the voltage at point G, i.e. on the gate electrode of the FET Q16, is maintained at a value close to the voltage at point A. After the capacitor C23 has discharged through the resistor R28 and a diode D29, the voltage at the point G is defined as follows: current flows from the +8 V supply via the resistor R25 and the diode D22 into the output from the buffer amplifier 21; the output voltage from the buffer amplifier 21 follows the input voltage at point A; 0.6 V is dropped by the current flowing through the diode D22; the voltage at the point P is thus 0.6 V greater than the voltage at the point A; current also flows from the +8 V supply and via the resistor R25 through the diode D24, the resistor R28 and the diode D29 to the low voltage at point F; the voltage drop across the diode D24 is likewise 0.6 V and thus compensates for the drop across the diode D22. Consequently, the voltage at the point Q faithfully follows the input voltage at point A, or at least the DC component thereof. Thus, as can be seen in the low portion of waveform G corresponding to the low portion of waveform F, low amplitude AC variations are also present at point G in addition to the DC component. While this characteristic is not essential, it is most advantageous for proper operation of the present invention, at least when an FET of the above-mentioned type is used.

There comes the point in time when the signal F returns to +8 V. The diode D29 is then turned off. The capacitor C23 recharges via the resistor R27. As soon as a charge of 0.6 V has built up on the capacitor C23, the diode D24 is also rendered non-conductive and the bulk of its charge necessarily flows in via the resistor R27. This gives a time constant of about 3 s (the product R27×C23 is 2.7 s). The voltage at point G thus rises smoothly up to a value of +8 V over a period of several seconds. This causes the FET Q16 to be progressively switched off, and consequently causes the filter properties of the two-port network 10 to change from the time constant R15×C12 to the much larger time constant of R11×C12. As mentioned above, the time constant R27×C23 is chosen as a function of the response characteristics of the FET Q16 in such a manner that the rate at which the time constant of the two-port filter network varies remains below the minimum frequency to be filtered.

As can be seen in waveform B of FIG. 3, this progressive increase in the filter time constant causes a rapid attenuation of the oscillations present in the output signal B, which signal thus settles rapidly on a value $V_2$ which corresponds to the new value of the DC component of the input signal A, i.e. it quickly settles to the new DC level present during phase III.

Tests have been performed on a weighing instrument having 2000 measurement points up to a full-scale deflection of 10 kg, i.e. having a resolution of 5 grams (g) for digital readout. The scale pan was subjected to vibration at a frequency of 1 Hz with an amplitude of ±100 scale divisions, i.e. ±500 g. A weight of known value was then placed on the scale pan. The exact value of said weight was obtained in 7 s.

Under steady state conditions, the filter circuit described above has "long" time constant of 4.84 s. This is the time constant which would apply if the FET Q16 and the resistor R15 were omitted. A similar filter network (i.e. without the variable resistance link) could be designed to give the same 2000 point accuracy of measurement under the same adverse conditions of vibration. It would need a time constant of at least 7.6 times the said "long" time constant, and would require a wait of about 40 s before settling down to an accurate measurement value. As mentioned above, such a wait is generally too long for the user and this leads to a push-button being provided in some cases to trigger an anticipated measurement reading. Unfortunately, such an anticipated reading is liable to a non-negligible degree of error.

Figure 5:
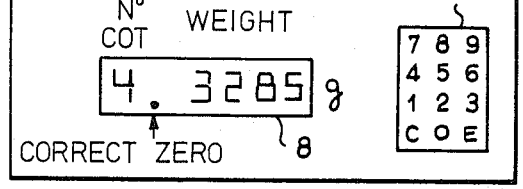
FIGS. 5, 6A, and 6B are illustrations of a control panel complete with display and keyboard, and of various different possible displays.

A complete measuring instrument in accordance with the present invention is obtained as follows: the filter 1 shown in FIG. 1 is replaced by a filter in accordance with the invention as shown in FIG. 2, and the output from this filter is applied to an analog-to-digital weight converter 4 as shown in FIG. 4. The high accuracy obtained in reasonable time now makes it possible to perform reliable differential measurements. For this purpose, instead of being directly connected to a digital readout 8, the converter 4 is connected to a logical control unit which is interconnected with memories 6 and a keypad 7 as well as being connected to drive the digital display 8. The keypad 7 and the digital display 8 are shown in FIG. 5, which shows an example of a control panel for use on baby scales. The keypad 7 has the conventional numerical keys plus a command C for making a correction and returning to a weight display, and a command E for causing a weight to be entered into the memory. The right-hand side of the digital display 8 has four significant figures for displaying a weight in the range 0 to 10 kg in 5 g increments. In known manner, a decimal point is displayed to indicate that the scales are properly zeroed. To the left of the decimal point, there is an additional display zone which serves to display address data, such as a cot number, said data being entered using the keypad 7 in a manner described below.

Figure 7:
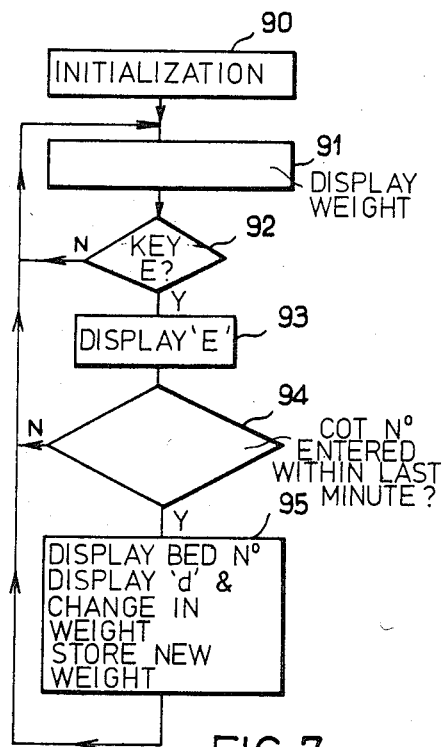
FIG. 7 is a flowchart showing the operation of the circuit shown in FIG. 4.
Figure 6A:
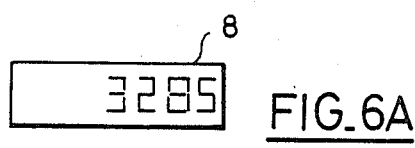
Figure 6B:
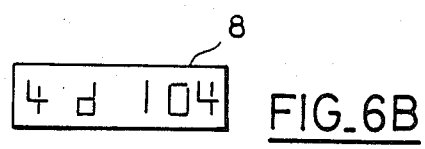

The control logic 5 is now described with reference to the flowchart of FIG. 7. After a first initialisation step 90, the steady state consists in displaying the weight at stage 91. The display then has the appearance of FIG. 6A, which in the example shown is displaying a weight of 3285 g. Subsequently, a test is made at 92 to see whether the operator has pressed key E. If not, the weight continues to be displayed. If the key E is pressed, the letter E is displayed in the address position of the display 8. The control logic then waits for a cot number (i.e. an address) to be entered by the operator via the keypad 7. If no cot number is keyed in, the control logic may continue to wait, but preferably it returns to displaying the weight at stage 91 after a predetermined time-out period, e.g. one minute. Suppose that the operator keys the cot or address number 4. Stage 95 then consists in displaying the cot number on the display (FIG. 6B) followed by the letter "d", indicating that the rest of the display concerns a weight difference. The control logic 5 then calculates the difference between the new weight and the old weight available in the memory at address 4. In the example shown this difference is 104 g which is displayed at shown in FIG. 6B. At the same time, the control logic substitutes the new value of weight, i.e. 3285 g for the old value in the memory 6 at address 4. The control logic then returns to its normal condition and displays the weight at stage 91.

This arrangement is particularly useful for monitoring the progress of babies in hospital. One or more babies are weighed before a feed and their weights are stored in the apparatus. After the feed, the babies are weighed again and the apparatus calculates the amount of weight each baby has gained. Ten memory addresses may be provided, for example, numbered 0 to 9. This number is naturally not limitative.

The detailed description which has been given above shows that the present invention is particularly applicable to weighing babies, but the invention is not limited to this application and it may also be used for weighing animals, or for performing a weighing operation in any circumstances where the scale pan is subjected to unwanted oscillations or vibrations. Similarly, the invention is applicable to situations where it is not the scale pan which is directly subjected to oscillations or vibrations but rather the support on which the scales are mounted. An example would be scales mounted in a delivery truck or other vehicle.

Naturally the present invention is not limited to the embodiment described, but extends to any variant covered by the accompanying claims. In particular, any of the circuit blocks 10, 20, 30, 40, 50, 60, 70 or 80 could be replaced by equivalent means.

We claim:

1. An electronic measurement circuit including a low-pass filter, in particular for weighing, said circuit comprising an active input terminal, an active output terminal, a common terminal, and a two-port low-pass filter network connected between said terminals and including resistive components and reactive components, the improvement wherein the circuit comprises:
   a link of controllable resistance connected in parallel with at least one of said resistive components;
   discriminator means responsive to an input signal on said active input terminal to provide an on/off type signal following variations in the DC component of said signal present at said active input terminal, the pulse width of said on/off signal increasing with increasing amplitude in the variation of said DC component;
   delay means for defining a "neutral" time interval of predetermined duration following the beginning of a pulse in said on/off signal; and
   control means for controlling said link of controllable resistance in such a manner as to switch in a low value of resistance at the end of said neutral time interval and to progressively increase said controllable value of resistance to a high value following the end of a pulse in said on/off signal.

2. A circuit according to claim 1, wherein said link of controllable resistance includes a field effect transistor (FET), and wherein said control means include a circuit having first and second time constants, said first time constant being suitable for causing said transistor to conduct rapidly after the end of said neutral time interval, and said second time constant being suitable for bringing said transistor to the off state in a progressive manner.

3. A circuit according to claim 2, wherein said control means include a circuit connected to said active input terminal and suitable for applying to the gate electrode of said FET a conduction control voltage close to the voltage present on said input terminal.

4. A circuit according to claim 2 or 3, wherein said link of controllable resistance and said circuit having first and second time constants are connected in such a manner that the time constant of the two-port filter network varies at a rate which is less than the minimum frequency to be filtered.

5. A circuit according to claim 1, wherein the minimum frequency to be filtered is about 1 Hz.

6. A circuit according to claim 1, wherein said discriminator means comprise an oscillation amplifier stage which has high gain, at least for low-level signals, and which is connected to said active input terminal, a comparator stage having one input connected to said active input terminal and having a second input connected to the output from said oscillation amplifier stage, and a differentiator stage connected to the output of said comparator stage, said on/off signal being defined on the basis of a lasting absence of pulses at the output from said differentiator stage.

7. A circuit according to claim 6, wherein said delay means comprise a retriggerable monostable connected to the output of said differentiator stage, said retriggerable monostable providing at its output said on/off signal less said neutral time interval of predetermined duration which is omitted from the beginning of said on/off signal.

8. A circuit according to claim 6, wherein the oscillation amplifier stage comprises a differential chopper amplifier having very high input impedance, the non-inverting input of said differential amplifier being connected to ground via a first capacitance and to said input terminal via a first resistance, and the inverting input thereto being connected firstly to said input terminal via a second resistance and secondly to the output thereof via a two-way anti-saturation diode feedback circuit.

9. A circuit according to claim 1, wherein said circuit is connected between a weight sensor circuit and an analog-to-digital converter for providing a digital indication of a sensed weight.

10. A circuit according to claim 9, wherein said analog-to-digital converter is followed by a control logic circuit having memories, a keyboard, and digital readout associated therewith, and wherein the control logic circuit responds to a specific command from the keyboard including information representative of a memory address to cause a newly-determined weight to be stored at said address and to display the difference between said newly-determined weight and the weight previously stored at said address.

* * * * *